Aug. 6, 1968
K. FOSTER
3,395,536
METHOD OF AND APPARATUS FOR TRANSMITTING ENERGY
BY PRESSURE OSCILLATIONS IN A FLUID
Filed Oct. 11, 1965
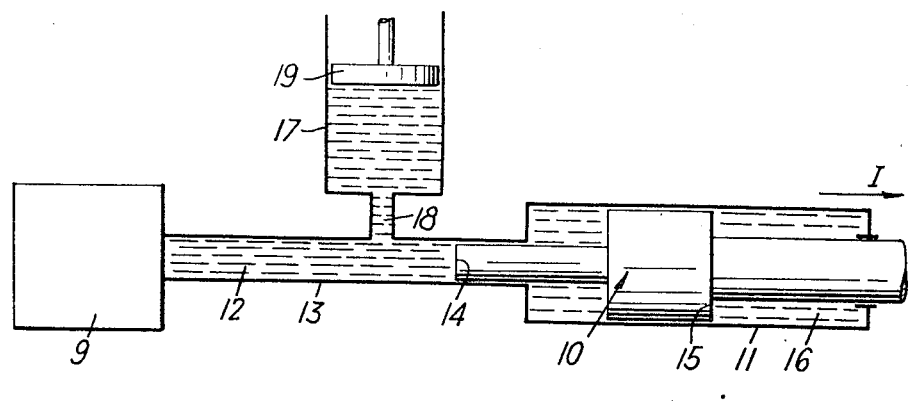

United States Patent Office 3,395,536
Patented Aug. 6, 1968

3,395,536
METHOD OF AND APPARATUS FOR TRANSMITTING ENERGY BY PRESSURE OSCILLATIONS IN A FLUID
Keith Foster, Birmingham, England, assignor to National Research Development Corporation, London, England
Filed Oct. 11, 1965, Ser. No. 494,502
Claims priority, application Great Britain, Oct. 13, 1964, 41,799/64
1 Claim. (Cl. 60—54.5)

ABSTRACT OF THE DISCLOSURE

In the transmission of energy by fluid pressure oscillations the volume of a reservoir chamber in communication with a supply conduit connected to a fluid pressure transducer is selected or adjusted so that the fluid pressure oscillations are in phase with the mechanical oscillations and the system thereby effectively "matched."

---

This invention comprises a method of and apparatus for transmitting energy by pressure oscillations in a fluid.

Transducers in which mechanical velocity oscillations are induced by pressure oscillations in a fluid have mechanical inertia. This causes the mechanical velocity oscillations to have a phase lag with respect to the fluid pressure oscillations. The present invention seeks to provide a means of matching the said mechanical and fluid oscillations.

According therefore to the present invention, in one aspect, there is provided a method of transmitting energy by pressure oscillations in a fluid comprising applying the fluid pressure oscillations through a conduit to a transducer member to induce mechanical velocity oscillations therein and adjusting the volume of a fluid space which is in communication with said conduit, so as to ensure that the said mechanical oscillations are substantially in phase with the said fluid oscillations.

Apparatus for transmitting energy by pressure oscillations in a fluid according to another aspect of the present invention comprises a conduit through which fluid pressure oscillations may be transmitted, a transducer member communicating with said conduit and arranged to oscillate mechanically in response to said fluid pressure oscillations, and a fluid space in communication with the said conduit, the volume of said fluid space being variable whereby the mechanical velocity oscillations of said transducer member may be rendered substantially in phase with said fluid pressure oscillations.

Preferably the fluid space comprises a cylinder the volume of which may be varied by movement of a piston therein.

The said transducer member preferably comprises a differential area piston, the larger area of which is in communication with said conduit.

The apparatus preferably includes a source of pressure fluid oscillations connected to said conduit.

The invention will be described, by way of example only, with reference to the accompanying drawings, which show diagrammatically one form of apparatus according to the invention.

The mechanical transducer 10 is arranged to oscillate in a cylinder 11 in response to pressure oscillations in a hydraulic fluid 12. The pressure oscillations are transmitted to the transducer 10 through a conduit 13 from a source 9.

The transducer 10 is in the form of a differential area piston, the larger area side 14, of which is in communication with the fluid 12 in the conduit 13, while the smaller area side 15, of which is in communication with a fluid space 16 in the cylinder 11.

A cylinder 17 communicates with the conduit 13 through a branch conduit 18. The cylinder 17 is filled with the fluid 12 and has a volume which may be varied by movement of a piston 19 in the cylinder 17.

The transducer 10 has a mechanical inertia, and consequently its velocity oscillations within the cylinder 11 will have a phase lag with respect to the pressure oscillations in the fluid 12. The transducer 10 behaves, therefore, analogously to an inductive load in an electrical circuit. In order to transmit the maximum amount of energy from the pressure oscillations in the hydraulic fluid to the transducer 10 it is necessary to "match" the effective "impedance" of the transducer 10 to the "characteristic impedance" of the conduit 13 so that there is no effective phase difference between the mechanical velocity oscillations of the transducer 10 and the fluid pressure oscillations.

To achieve such matching the volume of the fluid space enclosed in the cylinder 17 by the piston 19 is adjusted. Since the instantaneous flow of fluid in this fluid space is proportional to the rate of change of pressure applied thereto, this space acts analogously to a capacitance in an electrical circuit, having an inherent phase lead with respect to the fluid pressure oscillations. By suitable adjustment of the volume of the fluid space by means of the piston 19 the phase lead induced thereby may be arranged to counter-balance exactly the phase lag of the transducer 10. In these conditions the mechanical velocity oscillations of the transducer 10 are matched to the fluid pressure oscillations in the conduit 13. The transducer 10 therefore presents an effectively resistive load, since the instantaneous velocity of the transducer 10 when so matched is directly proportional to the pressure applied from the fluid 12.

Since the larger area side 14 of the transducer 10 is exposed to the fluid pressure oscillations, a resultant force will act in the direction of the arrow I. If the transducer 10 is connected directly to, or forms part of, an impact tool, this force may be utilised for cutting or drilling purposes.

A transducer 10 of the type described above suitable for use with the present invention is described in co-pending patent application Ser. No. 357,836, dated Apr. 6, 1964, now abandoned.

I claim:
1. Apparatus for transmitting energy by pressure oscillations in a fluid comprising a conduit filled with fluid through which fluid pressure oscillations may be transmitted, a transducer member for oscillating mechanically in response to and at substantially the same frequency as the frequency of said fluid pressure oscillations, said transducer member comprising a piston having two oppositely located fluid-contacting pressure-responsive faces of unequal surface area, the larger area face being in communication with said conduit to produce in operation a resultant force in the direction of the smaller area face, a chamber defined by walls all of which are rigid, said chamber having fluid therein which is in communication with the fluid in said conduit and turning means for selecting the volume of said chamber so as to render the mechanical velocity oscillations of said transducer member substantially in phase with said fluid pressure oscillations.

References Cited

UNITED STATES PATENTS

| | | | |
|---|---|---|---|
| 1,643,574 | 9/1927 | Breland | 60—54.5 X |
| 2,260,268 | 10/1941 | Warren et al. | 60—54.5 X |
| 3,123,061 | 3/1964 | Budroni | 60—54.5 X |

MARTIN P. SCHWADRON, *Primary Examiner.*

ROBERT R. BUNEVICH, *Assistant Examiner.*